(12) United States Patent
Tan et al.

(10) Patent No.: US 11,325,075 B2
(45) Date of Patent: May 10, 2022

(54) CARBON CAPTURE MEMBRANE

(71) Applicant: SINGAPORE UNIVERSITY OF TECHNOLOGY AND DESIGN, Singapore (SG)

(72) Inventors: Mei Chee Tan, Singapore (SG); Hong Yee Low, Singapore (SG); Yuanyuan Zhang, Singapore (SG); Him Cheng Wong, Singapore (SG)

(73) Assignee: SINGAPORE UNIVERSITY OF TECHNOLOGY AND DESIGN, Singapore (SG)

( * ) Notice: Subject to any disclaimer, the term of this patent is extended or adjusted under 35 U.S.C. 154(b) by 110 days.

(21) Appl. No.: 16/629,734

(22) PCT Filed: Jul. 10, 2018

(86) PCT No.: PCT/SG2018/050340
§ 371 (c)(1),
(2) Date: Jan. 9, 2020

(87) PCT Pub. No.: WO2019/013705
PCT Pub. Date: Jan. 17, 2019

(65) Prior Publication Data
US 2020/0129930 A1    Apr. 30, 2020

(30) Foreign Application Priority Data
Jul. 10, 2017    (SG) .......................... 10201705661V (51) Int. Cl.
*B01D 53/22* (2006.01)
*B01D 69/10* (2006.01)
(Continued)

(52) U.S. Cl.
CPC ........... *B01D 69/10* (2013.01); *B01D 53/228* (2013.01); *B01D 67/0088* (2013.01);
(Continued)

(58) Field of Classification Search
CPC .. B01D 69/141; B01D 2325/02; B01D 71/80; B01D 2325/04; B01D 67/0088;
(Continued)

(56) References Cited

U.S. PATENT DOCUMENTS 4,298,666 A * 11/1981 Taskier ................. H01M 50/46
429/206
7,344,585 B1    3/2008 Kulprathipanja et al.
(Continued)

FOREIGN PATENT DOCUMENTS

CN    103285827 A    9/2013
CN    103521100        1/2014
(Continued)

OTHER PUBLICATIONS

International Search Report for PCT/SG2018/050340 dated Sep. 27, 2018, 5 pages.
(Continued)

*Primary Examiner* — Anthony R Shumate
(74) *Attorney, Agent, or Firm* — Nixon & Vanderhye, P.C.

(57) ABSTRACT

There is provided a carbon capture mixed matrix membrane comprising: a polymeric support layer; and a carbon dioxide capture layer in contact with the polymeric support layer, the carbon dioxide capture layer comprising solid porous material with at least one carbon dioxide adsorption site, wherein the polymeric support layer comprises spatially ordered uniform sized pores. The polymeric support layer may be patterned by micro-molding, nanoimprinting, mold-based lithography or other suitable lithographic process. The carbon dioxide capture layer may comprise amine-functionalised material, metal-organic frameworks such as zeolite imidazolate framework 8 (ZIF-8) or copper benzene-1,3,5-tricarboxylate (Cu-BTC) which may or may not be amine
(Continued)

modified. There is also provided a membrane module comprising at least one carbon capture mixed matrix membrane and a method of forming the carbon capture mixed matrix membrane.

19 Claims, 7 Drawing Sheets

(51) Int. Cl.
| | |
|---|---|
| *B01D 67/00* | (2006.01) |
| *B01D 69/14* | (2006.01) |
| *B01D 71/34* | (2006.01) |
| *B01D 71/56* | (2006.01) |
| *B01D 71/68* | (2006.01) |
| *B01D 71/80* | (2006.01) |

(52) U.S. Cl.
CPC ........... *B01D 69/141* (2013.01); *B01D 71/34* (2013.01); *B01D 71/56* (2013.01); *B01D 71/68* (2013.01); *B01D 71/80* (2013.01); *B01D 2257/504* (2013.01); *B01D 2323/46* (2013.01); *B01D 2325/02* (2013.01); *B01D 2325/04* (2013.01)

(58) Field of Classification Search
CPC ............... B01D 69/10; B01D 2323/46; B01D 2257/504; B01D 53/228; B01D 71/56; B01D 71/68; B01D 71/34
See application file for complete search history.

(56) References Cited

U.S. PATENT DOCUMENTS

| | | | | |
|---|---|---|---|---|
| 8,545,770 | B2* | 10/2013 | Viovy | B01L 3/502707 422/502 |
| 9,486,742 | B1 | 11/2016 | Rempe et al. | |
| 2005/0204920 | A1 | 9/2005 | Hong et al. | |
| 2007/0022877 | A1 | 2/2007 | Marand et al. | |
| 2012/0222555 | A1* | 9/2012 | Gupta | B01J 20/28019 95/136 |
| 2013/0167494 | A1* | 7/2013 | Shimazaki | B01D 46/0002 55/492 |
| 2015/0190762 | A1* | 7/2015 | Van Kessel | B01D 69/127 96/12 |
| 2017/0291147 | A1* | 10/2017 | Tang | B01D 53/228 |
| 2017/0341017 | A1* | 11/2017 | Dutta | B01D 53/228 |
| 2018/0036672 | A1* | 2/2018 | Sundaram | B01D 53/0423 |
| 2019/0022595 | A1* | 1/2019 | Wong | B01D 67/003 |
| 2020/0047114 | A1* | 2/2020 | Al-Maythalony | B01D 71/028 |
| 2020/0269194 | A1* | 8/2020 | Al-Maythalony | B01D 71/64 |
| 2020/0353424 | A1* | 11/2020 | Ale Ebrahim | B01D 67/0041 |
| 2021/0129086 | A1* | 5/2021 | Peterson | B32B 7/12 |

FOREIGN PATENT DOCUMENTS

| | | |
|---|---|---|
| CN | 103857467 A | 6/2014 |
| CN | 106 178 999 A | 12/2016 |
| CN | 103372420 A | 7/2017 |

OTHER PUBLICATIONS

Written Opinion of the ISA for PCT/SG2018/050340 dated Sep. 27, 2018, 6 pages.
Shen et al., "Polyethylenimine Applications in Carbon Dioxide Capture and Separation: From Theoretical Study to Experimental Work", Energy Technol., vol. 5, Feb. 22, 2017, pp. 822-833.
Peters et al., "Comparing flat and micro-patterned surfaces: Gas permeation and tensile stress measurements", J. Membr. Sci., vol. 320, No. 1-2, Apr. 8, 2008, pp. 173-178.
Wong et al., "Predictive Design, Etch-Free Fabrication of Through-Hole Membrane with Ordered Pores and Hierarchical Layer Structure", Adv. Mater. Technol., vol. 2, No. 2, Nov. 15, 2016, pp. 1600169 (1-9).
Supplemental Search Report and Search Opinion for Application EP 18 83 1717 dated Mar. 1, 2021.
Nafisi Vajiheh et al., "Development of Dual Layer of ZIF-8/PEBAX-2533 mixed matrix membrane for CO2 Capture", Journal of Membrane Science, vol. 459, Jun. 1, 2014, pp. 244-255, XP055778034.
Wong, K.C. et al., "Thin film nanocomposite: the next generation selective membrane for CO 2 removal", Journal of Materials Chemistry A, vol. 4, No. 41, Jan. 1, 2016, pp. 15726-15748, XP055778040.

* cited by examiner

CARBON CAPTURE MEMBRANE

This application is the U.S. national phase of International Application No. PCT/SG2018/050340 filed Jul. 10, 2018 which designated the U.S. and claims priority to SG Patent Application No. 10201705661V filed Jul. 10, 2017, the entire contents of each of which are hereby incorporated by reference.

TECHNICAL FIELD

The present invention relates to a carbon capture membrane, a membrane module comprising the carbon capture membrane and a method of forming the carbon capture membrane.

BACKGROUND

Commercial carbon dioxide ($CO_2$) separation technologies are based primarily on chemical solvent absorption method through the use of bulk liquids or solids such as liquid amine-based solution and soda lime granule. These technologies are currently used in industrial, submarine and spaceship environment. The liquid and solid absorbers are packed in large scale tanks/containers, and hence a drawback of the current technologies is the bulky and heavy forms. In particular, the current principal capture technology relies heavily on the use of a liquid solvent to separate $CO_2$ from $N_2$. This method typically requires additional processing steps where $CO_2$ is desorbed, concentrated to required levels before finally being compressed and liquefied to be transported or stored. The identification of suitable storage locations for the captured $CO_2$ also presents an immense challenge for the $CO_2$ capture industry. In addition, the high energy penalties and carbon footprint (e.g., energy costs for refrigeration) of current $CO_2$ capture technologies serve as further barriers to the wide implementation $CO_2$ capture.

Membrane technology offers an appealing $CO_2$ capture alternative since the required maintenance is low, no separating agent is required, and no phase changes are involved. The membrane technologies are also more easily integrated into existing process streams and the modular aspects of membrane units allow for multi-stage operations. The subsequent linear scale-up costs further accelerate the design time of larger scale units. In particular, the widely investigated mixed matrix composites membrane mainly refers to materials composed of a continuous polymer bulk matrix and dispersed fillers embedded in the polymer matrix. The mixed matrix usually possesses random microspore or mesopore structures together with inorganic nanofillers that endow the mixed matrix membrane with the ability to separate and purify gas streams with improved thermal stability. However, the large pressure drop or pressure build-up of the membrane limits its application as a separation/capture material.

There is therefore a need for an improved membrane for carbon capture applications.

SUMMARY OF THE INVENTION

The present invention seeks to address these problems, and/or to provide an improved carbon capture membrane.

In general terms, the invention relates to a carbon capture membrane, which is thin and light weight. The membrane may be molded and adapted easily to fit with existing infrastructure or process lines. The membranes may also be integrated as part of a modular system to facilitate the switching between fresh and used membranes due to fouling. The used membranes can be easily taken offline to be regenerated.

According to a first aspect, the present invention provides a carbon capture mixed matrix membrane comprising:
a polymeric support layer; and
a carbon dioxide capture layer in contact with the polymeric support layer, the carbon dioxide capture layer comprising solid porous material with at least one carbon dioxide adsorption site,
wherein the polymeric support layer comprises spatially ordered uniform sized pores.

The carbon dioxide capture layer may be in contact with the polymeric support layer by any suitable means. For example, the carbon dioxide capture layer may be disposed on the polymeric support layer or embedded within the polymeric support layer.

The polymeric support layer may be any suitable polymeric support layer. The polymeric support layer may comprise any suitable polymer. The polymer may be a UV curable resin such as an acrylic-based rein, an epoxy-based resin, phenolic-based resin, or copolymers thereof. For example, the polymeric support layer may comprise, but is not limited to, polyvinylidene difluoride (PVDF), polyethersulfone (PES), polysulfone (PSF), polyether block amine (PEBA), or copolymers thereof.

The polymeric support layer may have any suitable thickness. In particular, the polymeric support layer may have a thickness of 50-500 μm.

According to a particular aspect, the polymeric support layer may comprise a patterned surface. The surface may comprise any suitable pattern.

According to a particular aspect, the polymeric support layer may comprise spatially ordered through-holes.

The pores comprised in the polymeric support layer may have a suitable average diameter. For example, the average diameter of each pore may be 100 nm-100 μm.

The carbon dioxide capture layer may comprise any suitable solid porous material with at least one carbon dioxide adsorption site. For example, the solid porous material comprised in the carbon dioxide capture layer may comprise amine-functionalised material. For example, the carbon dioxide capture layer may comprise the following material, but is not limited to, polyethyleneimine(PEI)@silica, PEI@graphene oxide, polyaniline(PANI)@graphene oxide, PEI@nanoporous carbons (NPCs), PEI@metal-organic framewoks (MOF),PEI@oxidised nanofibrillated cellulose (NFC), PEI@porous organic polymer, PEI@mesoporous molecular sieve, tetraethylenepentamine(TEPA)@grahene oxide, TEPA@silica, metal-organic frameworks such as zeolite imidazolate framework 8 (ZIF-8) or copper benzene-1,3,5-tricarboxylate (Cu-BTC) which may or may not be amine modified, or a combination thereof.

The solid porous material may comprise pores. For example, the pores comprised within the solid porous material may have an average diameter of 1-100 nm.

According to a particular aspect, the solid porous material may comprise a porous particle template with particles having an average particle size of 5-100 nm.

The carbon capture mixed matrix membrane may have a suitable thickness. For example, the thickness of the membrane may be 50-2500 μm.

According to a second aspect, the present invention provides a membrane module comprising at least one carbon capture mixed matrix membrane described above.

The membrane module may comprise two or more carbon capture mixed matrix membranes. In particular, each of the two or more carbon capture mixed matrix membranes may comprise a polymeric support layer of uniform sized pores, the pores of each polymeric support layer having a different pore size, thereby forming a hierarchical membrane module.

According to a third aspect, the present invention provides a method of forming the carbon capture mixed matrix membrane as described above, the method comprising:
  providing a polymeric support layer; and
  forming a carbon dioxide capture layer in contact with the polymeric support layer, wherein the carbon dioxide capture layer comprises solid porous material with at least one carbon dioxide adsorption site.

The forming may be by any suitable means. For example, the forming may comprise depositing the carbon capture layer on the polymeric support layer or embedding the carbon capture layer in the polymeric support layer.

According to a particular aspect, the depositing may comprise dip-coating, spin coating, casting or a combination thereof. According to another particular aspect, the embedding may comprise solution processing.

BRIEF DESCRIPTION OF THE DRAWINGS

In order that the invention may be fully understood and readily put into practical effect there shall now be described by way of non-limitative example only exemplary embodiments, the description being with reference to the accompanying illustrative drawings. In the drawings:

FIG. 6(a) shows a photograph of PANI@GO membrane, FIGS. 6(b), (c) and (d) show cross-sectional electron micrographs of the membrane and FIG. 6(e) shows the carbon capture capacity of PANI@GO membrane;

FIGS. 9(a) and (b) show electron micrographs of a PEI@silica modified through-hole membrane and FIGS. 9(c) and (d) show electron micrographs of a PEI@silica modified patterned PEBA membrane;

FIG. 10(a) shows a photograph and FIGS. 10(b) and (c) show electron micrographs of a membrane according to one embodiment of the present invention;

FIG. 11(a) shows a photograph of PEBA/PANI@GO membrane and FIGS. 11(b) and (c) show cross-sectional electron micrographs of the membrane.

DETAILED DESCRIPTION

As explained above, there is a need for an improved carbon dioxide absorbent membrane.

Generally, the method of the present invention involves a carbon capture mixed matrix membrane having a layered structure. The carbon dioxide capture layer provide adsorption sites for the carbon dioxide ($CO_2$) capture, and the carbon dioxide capture layer is supported by a continuous polymer support layer. The polymer support layer may possess good mechanical properties and easy process ability. The membrane of the present invention being thin and layered facile creation of macrostructures on the membrane maximise surface area, thereby maximising the $CO_2$ absorption by getting rid of undesirable flow effects such as by fouling or pressure build-up. For example, the ordered pores on the support layer may provide easy access for $CO_2$ to the active adsorption sites in the carbon dioxide capture layer and thereby reduce pressure drop over the membrane.

The present invention also provides a modular separation system comprising one or more membrane modules. The membrane module may comprise at least one membrane, particularly two or more membrane to provide a hierarchy pore structure. The membrane module therefore provides the ability to provide a modular cassette of the membranes with varying $CO_2$ capture capacities and separation performance, thereby improving the overall $CO_2$ absorption efficiency of the membrane.

According to a first aspect, the present invention provides a carbon capture mixed matrix membrane comprising:
  a polymeric support layer; and
  a carbon dioxide capture layer in contact with the polymeric support layer, the carbon dioxide capture layer comprising solid porous material with at least one carbon dioxide adsorption site,
wherein the polymeric support layer comprises spatially ordered uniform sized pores.

Polymeric Support Layer

The polymeric support layer may be any suitable polymeric support layer comprising spatially ordered uniform sized pores.

The polymeric support layer may comprise any suitable polymer. The polymer may be a thermoplastic, thermoset, elastomer, or a combination thereof.

In particular, the polymer may be a UV curable resin such as an acrylic-based rein, an epoxy-based resin, phenolic-based resin, or copolymers thereof. For example, the polymeric support layer may comprise, but is not limited to, polyvinylidene difluoride (PVDF), polyethersulfone (PES), polysulfone (PSF), polyether block amine (PEBA) or co-polymers thereof.

The polymeric support layer may have any suitable thickness. In particular, the polymeric support layer may have a thickness of 50-500 μm.

According to a particular aspect, the polymeric support layer may comprise a patterned surface. The surface may comprise any suitable pattern. The polymeric support layer which is patterned may result in an increase in surface area for $CO_2$ capturing. In particular, a patterned polymeric support layer may result in about a 50% increase in the $CO_2$ capture capacity of the carbon capture mixed matrix membrane comprising the patterned polymeric support layer.

The polymeric support layer may be patterned by any suitable patterning method. For example, the polymeric support layer may be patterned by micro-molding, nanoimprinting, other suitable lithographic process, or a combination thereof.

Figure 1:
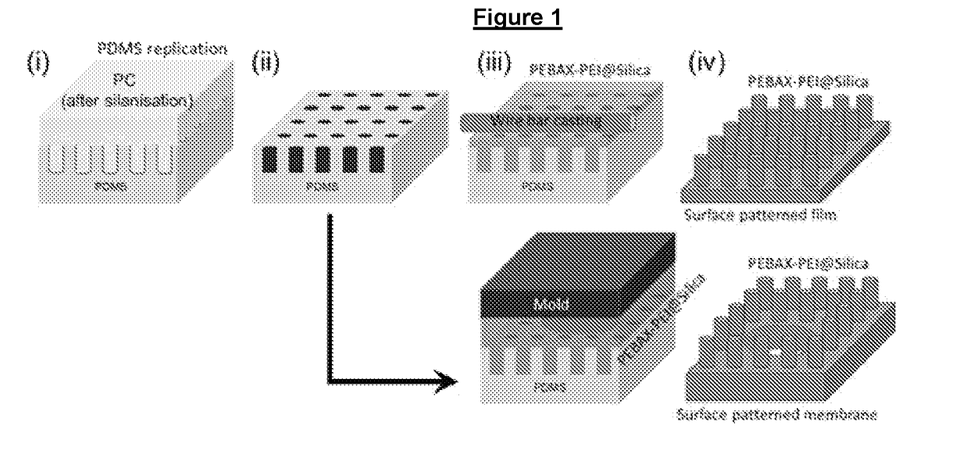
FIG. 1 shows a schematic representation of a fabrication strategy for surface patterned layers.

According to a particular aspect, the polymeric support layer may be patterned by wire bar coating technique as shown in FIG. 1. A polymeric solution with or without $CO_2$ capture particles may be poured over and infiltrated into a templated PDMS with a negative tonality. A wire bar or doctor blade may be used to control the thickness of the polymeric patterned membrane that will be formed when the solvent is evaporated. As shown in FIG. 1, another pattern membrane forming option may be used in which an elastomeric polydimethylsiloxane (PDMS) mold whose surface has been patterned with relief structures may be placed on substrates that can either be planar or curved such as glass, silicon wafer, capillary tube and polymer film. The compliant nature of PDMS allows conformal contact between the mold and the substrate (which can also be patterned), forming a network of interconnected channels for the polymer solution with or without $CO_2$ capture particles (such as PEBA only, or PEBA with particles suspended) to spontaneously infiltrate into the channels by capillary action. After infiltration, the excess solvent may be vaporized and a polymer membrane may be formed before PDMS demolding and through-hole membrane may be peeled from the substrate for use.

The polymeric support layer comprises spatially ordered uniform sized pores. The pores may be micropores or nanopores. For the purposes of the present invention, the polymeric support layer comprising ordered pores refers to an array of pores having a systematic arrangement. For example, the pore array may be such that there are a pre-determined number of rows and columns of pores, each row and column having a pre-determined number of pores. The pores in each row and/or column may be the same or different. Ordered pores may also be taken to comprise pores arranged in a non-random manner. For example, each pore may be spaced equidistant from one another.

The pores may have any suitable shape. For example, the pores may be spherical, oval, rod, and the like.

The pores may have any suitable size. Pore size may be measured by any suitable method such as (optical or electron) microscopy. Pore size of each pore refers to the average pore diameter. According to a particular aspect, the pores may have a substantially uniform pore size. For example, at least about 80% of the pores have a uniform pore size. In particular, at least about: 90%, 95%, 98% or 100% of the pores have a uniform pore size. The pores comprised in the polymeric support layer may have a suitable average pore diameter. For example, the average pore diameter of each pore may be 100 nm-100 µm. In particular, the average pore diameter of each pore may be 200 nm-90 µm, 300 nm -80 µm, 400 nm-70 µm, 500 nm-60 µm, 600 nm-50 µm, 700 nm-50 cm, 800 nm-40 µm, 900-30 µm, 1-20 µm, 5-10 µm. Even more in particular, the average pore diameter of each pore may be 5-30 µm.

The pores may be formed by any suitable method. For example, the method may be by micro-molding, nanoimprinting, other suitable lithographic process, or a combination thereof.

According to a particular aspect, the polymeric support layer may comprise spatially ordered through-holes. The through-holes may extend all the way from a top surface of the polymeric support layer to a bottom surface of the polymeric support layer.

According to a particular aspect, the through-holes may have different pore center-to-center distance. By changing a pore center-to-center distance, the density of the pores formed may change. In particular, a short distance may give a high pore density film, and vice versa. The pore density may be optimized based on the $CO_2$ capture performance, microstructure used and other physical properties such as the mechanical properties and the processing methods used.

Figure 2:
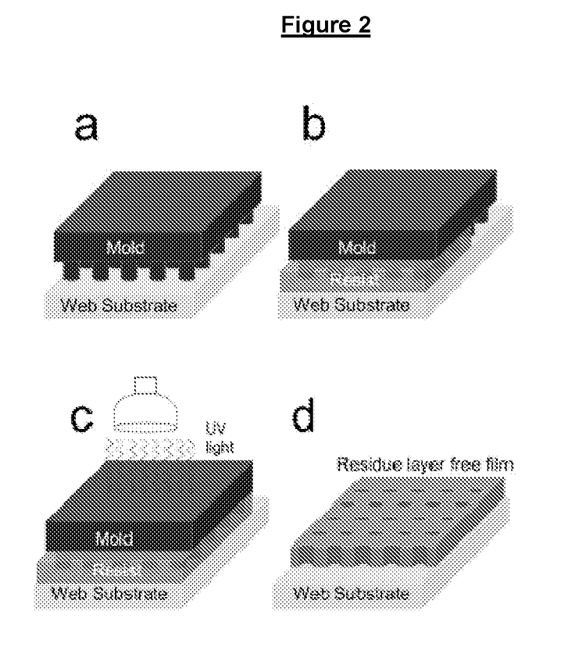
FIG. 2 shows a schematic representation of a Micromolding in Capillaries (MIMIC) process.

The through-holes may be prepared by any suitable method. For example, the through-holes may be formed by mold-based lithography. In particular, the through-holes may be formed by capillary force lithography. An example may be by using Micromolding in Capillaries (MIMIC) as known in the art. MIMIC is a simple, versatile soft lithography technique capable of generating complex, open-through polymeric microstructures with good pattern fidelity. FIG. 2 provides a schematic illustration of the MIMIC process.

As shown in FIG. 2, an elastomeric polydimethylsiloxane (PDMS) mold whose surface had been patterned with relief structures may be placed on substrates that can either be planar or curved such as glass, silicon wafer, capillary tube and polymer film. The compliant nature of PDMS allows conformal contact between the mold and the substrate (which can also be patterned), forming a network of interconnected channels for UV-curable photoresist to spontaneously infiltrate into the channels by capillary action. After infiltration, the photoresist may be polymerised with ultraviolet (UV) light source before PDMS demolding and through-hole membrane is peeled from the substrate for use.

The capillary filling of liquid resist may be thermodynamically driven to minimise the free energies of solid-vapour and solid-liquid interfaces, in which the filling kinetics and distance may be an interplay between interfacial thermodynamics and viscosity drag. Therefore, the three main components of MIMIC process: the PDMS mold, substrate and liquid resist must meet certain criteria. In particular, the criteria includes: (i) elastomeric and inert nature of mold; and (ii) complete or partial wetting of the inner cavity wall (support and PDMS mold) by the liquid resist. The contact angle of the resist on the surface of PDMS mold and the substrate must therefore be between 0 and 90°. Photoresists with low viscosity (<300 cP), low surface tension and/or mold materials with high surface energy are most effective for MIMIC.

General photolithography processes require the use of energetic beam (electrons, photons, ions) and multiple steps including forming, patterning, and developing procedures and mainly confined to patterning planar structures. On the other hand, MIMIC requires only one (forming and patterning) step and may achieve quasi-three-dimensional patterns with different height and curvature. Further, MIMIC does not require elaborate post-etching steps and costly instrumentations to fabricate the open-through polymeric support layer with ordered through-hole microwells.

Carbon Dioxide Capture Layer

The carbon dioxide capture layer may comprise any suitable solid porous material with at least one carbon dioxide adsorption site. For example, the solid porous material comprised in the carbon dioxide capture layer may comprise amine-functionalised material. For example, the carbon dioxide capture layer may comprise the following material, but is not limited to, polyethyleneimine(PEI)@silica, PEI@graphene oxide, polyaniline(PANI)@graphene oxide, PEI@nanoporous carbons (NPCs), PEI@metal-organic framewoks (MOF),PEI@oxidised nanofibrillated cellulose (NFC), PEI@porous organic polymer, PEI@mesoporous molecular sieve, tetraethylenepentamine(TEPA)@grahene oxide, TEPA@silica, metal-organic frameworks such as zeolite imidazolate framework 8 (ZIF-8) or copper benzene-1,3,5-tricarboxylate (Cu-BTC) which may or may not be amine modified, or a combination thereof.

Amine groups reacts with acidic $CO_2$ and solid porous adsorbent material supply the high surface area to further increase the chances for $CO_2$ and amine interaction, thereby enhancing the absorption ability of $CO_2$. $CO_2$ may be subsequently recovered through desorption by heating to higher temperatures.

The solid porous material may comprise pores. The pores may be of any suitable shape. For example, the pores may be spherical or non-spherical. For example, the pores comprised within the solid porous material may have an average diameter of 1-100 nm. In particular, the average diameter of the pores may be 5-95 nm, 10-90 nm, 15-85 nm, 20-80 nm, 25-75 nm, 30-70 nm, 35-65 nm, 40-60 nm, 45-55 nm.

According to a particular aspect, the pores may be ordered or disordered. For the purposes of the present invention, ordered pores may be as defined above in relation to pores of the polymeric support layer. For the purposes of the present invention, disordered pores may be defined as pores which do not follow any specific arrangement and are randomly distributed within the solid porous material.

According to a particular aspect, the solid porous material may comprise a porous particle template with particles having an average particle size of 5-100 nm. One of the advantages of using a porous particle template is that it may provide a high surface area for the impregnation of a high density of $CO_2$ capture molecules (e.g., short chain PEI oligomers). By entrapping the $CO_2$ capture molecules within the porous particle template, it reduces the evaporative loss of the volatile molecules and extends the regeneration cycles of the carbon capture materials.

Examples of different carbon dioxide capture layers will now be provided. However, the carbon dioxide capture layer of the present invention is not limited to the following and may include other carbon dioxide capture layers.
(i) PEI@Silica Nanofillers Polyethylenimine (PEI)@fumed silica nanofillers were formed by mixing PEI having different molecular weight (MW 25,000 and 800) and fumed silica with the ratio of PEI and silica being 0.5 and 0.5 using different solvents (deionized water and methanol). The Brunauer-Emmett-Teller (BET) surface area, pore volume and $CO_2$ capacity of (PEI)@fumed silica nanofillers are shown in Table 1.

TABLE 1

BET surface area, pore volume and $CO_2$ capacity of various nanofillers

| Sample | Surface area ($m^2/g$) | Pore volume ($cm^3/g$) | $CO_2$ capacity (mg/g) |
|---|---|---|---|
| Fumed silica | 277.35 | 0.51 | — |
| PEI@silica-MW 25000 (DI water) | 63.35 | 0.80 | 29.0 |
| PEI@silica-MW25000 (Methanol) | 18.04 | 0.26 | 140.8 |
| PEI@silica-MW8000 (Methanol) | 17.55 | 0.25 | 167.2 |

As can be seen from Table 1, PEI(800)@silica has the smallest surface area and pore volume, however shows the largest $CO_2$ capacity at 75° C.), which meets the existing reported benchmarks of 132 to 141 mg of $CO_2$/g material.

Figure 3:
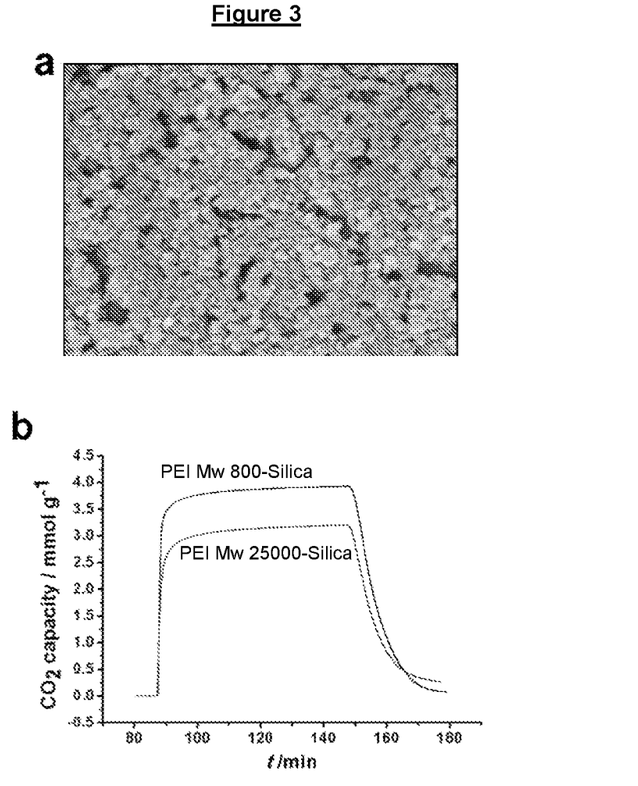
FIG. 3(a) shows an electron micrograph and FIG. 3(b) shows the carbon capture capacity of PEI@silica.

FIG. 3 provides the electron micrograph of PEI(800) @silica and the carbon capture capacity benchmark standards (Energy Environ. Sci., 2015, 5:5742-5749).
(ii) PEI@Graphene Oxide(GO)

The carbon dioxide capture layer may also comprise carbon capture materials that have a reduced embodied energy with the use of photoabsorbers to enable photothermal $CO_2$ desorption following being used for carbon dioxide capture in the carbon capture mixed matrix membrane. GO and graphene have been widely used as photothermal conversion materials due to their high photothermal conversion efficiency, easy fabrication and low cost.

According to a particular aspect, the solid porous material may comprise a graphene oxide aerogel. The graphene oxide (GO) aerogel may be formed from any suitable method. For example, the GO aerogel may be formed by a hydrothermal method. The GO aerogel may have a high surface area and good $CO_2$ capture ability via physisorption. FIG. 4(a) shows an electron micrograph of a GO aerogel and FIG. 4(b) shows the carbon capture capacity of the GO aerogel.

To enhance the $CO_2$ capture ability, PEI was modified on GO sheets. The PEI@GO complexes as the carbon dioxide capture layer may be modified on a polymeric support layer to form a carbon capture mixed matrix membrane. As shown in FIG. 4(c), PEI@GO composites may convert photo energy into thermal energy by NIR light irradiation and the temperature may reach 74.4° C. after 5 seconds of irradiation.
(iii) Polyaniline(PANI)@Graphene Oxide(GO)

Another example of the carbon dioxide capture layer may be one which comprises a photothermal conversion material with a GO-based composite material to further enhance its photothermal conversion ability. Polyaniline (PANI) is a photothermal conversion polymer that may be easily modified on the surface with many functional groups through in-situ polymerization. Moreover, the aniline subunits may be able to interact with $CO_2$, which enhance the $CO_2$ capture ability further. PANI may be modified on GO sheets to produce PANI@GO composites. FIG. 5(a) shows an electron micrograph of a PANI@GO composite and FIG. 5(b) shows the carbon capture capacity of the PANI@GO composites. Compared with GO, PANI@GO shows better $CO_2$ capture ability.

The PANI@GO composite may be fabricated into a carbon dioxide capture layer using any suitable method. According to a particular aspect, the PANI@GO composite may be fabricated into a carbon dioxide capture layer using a filtration process. FIG. 6(a) shows a photograph of a PANI@GO layer as a carbon dioxide capture layer according to one embodiment of the present invention. FIGS. 6(b), 6(c) and 6(d) shows a cross-sectional electron micrographs of the PANI@GO layer and FIG. 6(e) shows the carbon capture capacity of the PANI@GO layer. FIG. 6(d) shows that the PANI@GO layer has a nanofibrous structure between layers. Accordingly, the PANI@GO layer possesses considerable increase in surface area which translates to a better and improved $CO_2$ capture ability as can be seen from FIG. 6(e). Compared with the PEI@GO composites, PANI@GO composites show a better photothermal conversion ability and the highest temperature reached is 104° C.
Carbon Capture Mixed Matrix Membrane The carbon capture mixed matrix membrane comprises a polymeric support layer and a carbon dioxide capture layer in contact with the polymeric support layer, the carbon dioxide capture layer comprising solid porous material with at least one carbon dioxide adsorption site, wherein the polymeric support layer comprises spatially ordered uniform sized pores.

The carbon dioxide capture layer may be in contact with the polymeric support layer by any suitable means. According to a particular aspect, the carbon dioxide capture layer may be in contact with the polymeric support layer by being disposed on the polymeric support layer.

The carbon dioxide capture layer may be disposed on the polymeric support layer by any suitable method. For example, the carbon dioxide capture layer may be disposed on the polymeric support layer by dip-coating, spin coating, casting, or the like. In particular, the carbon dioxide layer may be disposed on the polymeric support layer by dip-coating during which the polymeric support layer may be immersed in a bath containing a dilute solution of the carbon dioxide capture layer in a suitable solvent. In this way, the pore size and pore density of the carbon capture mixed matrix membrane may be tuned. Pore size and pore density are two important carbon capture mixed matrix membrane design criteria for maximising the $CO_2$ absorption.

According to a particular aspect, the carbon dioxide capture layer may be embedded within the polymeric support layer. The carbon dioxide capture layer may be embedded within the polymeric support layer by any suitable method. For example, the carbon dioxide capture layer may be embedded within the polymeric support layer by solution processing, or the like. In particular, the carbon dioxide layer may be embedded on the polymeric support layer by solution processing during which the polymeric support layer and the carbon dioxide capture layer may be vigorously stirred in a common solvent to ensure good dispersion of the carbon dioxide capture layer.

Figure 7:
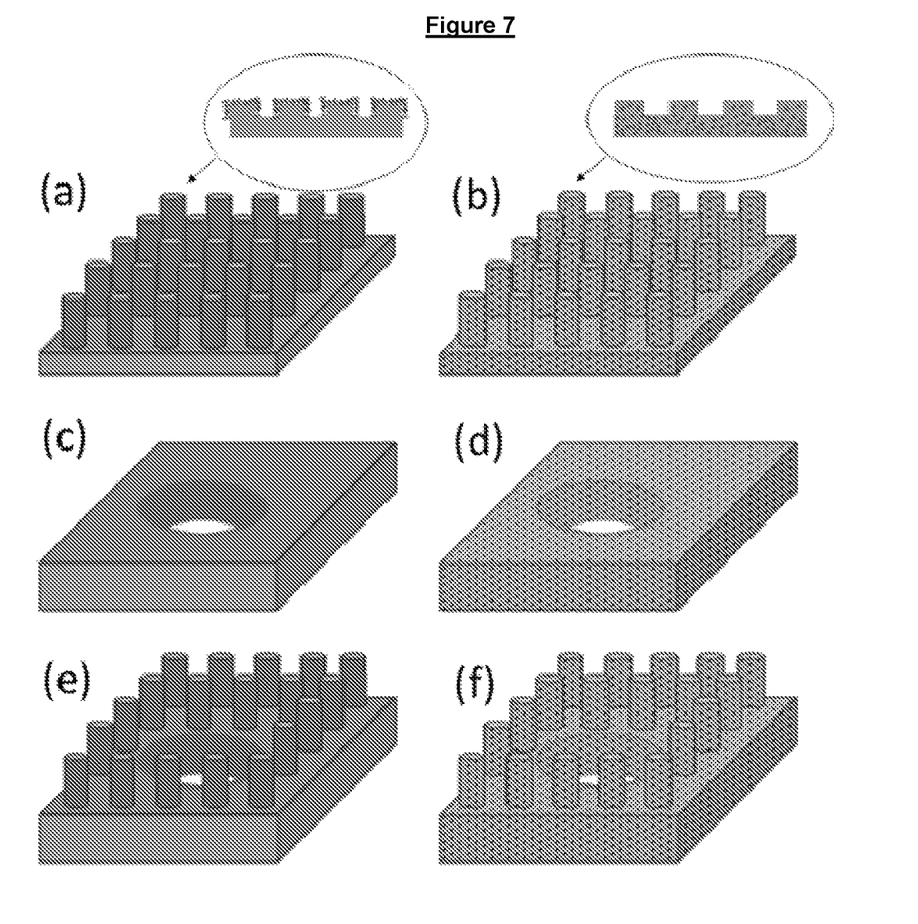
FIG. 7 shows a schematic representation two embodiments of carbon capture mixed matrix membrane.

FIG. 7 provides a schematic representation of two embodiments of the carbon capture mixed matrix membrane. FIGS. 7(a), (c) and (e) represent carbon capture mixed matrix membranes in which the carbon dioxide capture layer is deposited on the polymeric support layer, and FIGS. 7(b), (d) and (f) represent carbon capture mixed matrix membrane in which the carbon dioxide capture layer is embedded within the polymeric support layer. The polymeric support layers may comprise: a patterned layer as shown in FIGS. 7(a) and (b); through-holes as shown in FIGS. 7(c) and (d); or a surface patterned through-hole layer as shown in FIGS. 7(e) and (f).

Figure 8:
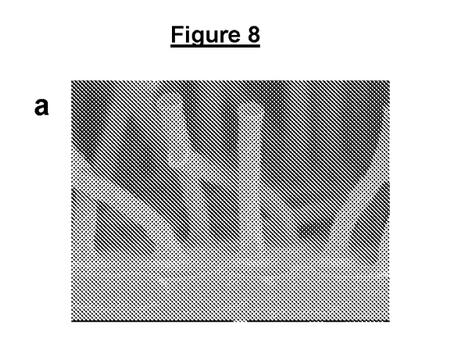
FIG. 8(a) shows SEM image of a carbon dioxide capture layer according to one embodiment.
FIG. 8(b) shows SEM image of a carbon dioxide capture layer according to one embodiment.
FIG. 8(c) shows an SEM image of a through-hole surface patterned carbon capture mixed matrix membrane.

FIG. 8(a) shows a scanning electron microscope (SEM) image of high aspect ratio structure comprising the carbon dioxide capture layer. FIG. 8(b) shows an SEM image of an intermediate aspect ratio carbon capture mixed matrix membrane and FIG. 8(c) shows an SEM image of a through-hole carbon capture mixed matrix membrane with surface patterned ridges.

The carbon capture mixed matrix membrane may have a suitable thickness. For example, the thickness of the membrane may be 50-2500 µm. In particular, the thickness may be 100-2000 µm, 150-1500 µm, 200-1000 µm, 300-900 µm, 400-800 µm, 500-700 µm, 600-650 µm. Even more in particular, the thickness may be 50-500 µm.

Examples of different carbon capture mixed matrix membranes will now be provided. However, the carbon capture mixed matrix membrane of the present invention is not limited to the following and may include other carbon capture mixed matrix membranes.

(i) PEBA/PEI@Silica Carbon Capture Mixed Matrix Membrane

An example of a carbon capture mixed matrix membrane according to the present invention is a PEBA/PEI@silica carbon capture mixed matrix membrane. The carbon capture mixed matrix membrane is comprised of a polymeric support layer comprising PEBA and a carbon dioxide capture layer comprising PEI@silica.

Figure 9:
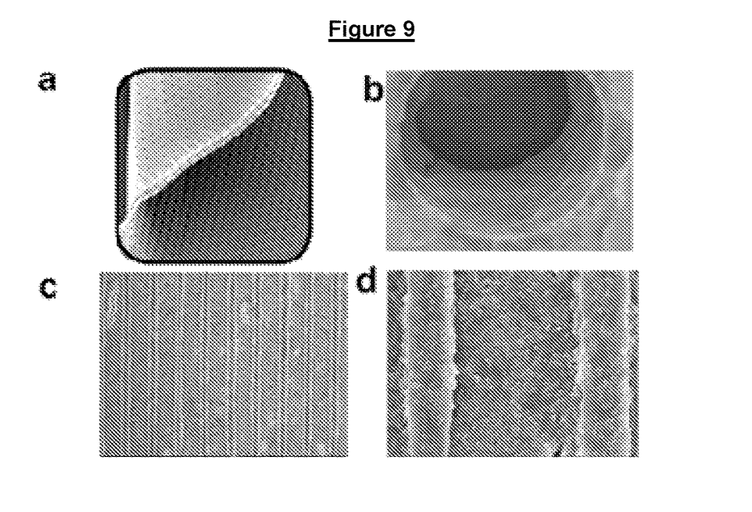

According to a particular embodiment, the carbon dioxide capture layer comprising PEI@silica may be deposited on the PEBA polymeric support layer. In particular, the PEBA polymeric support layer may comprise a through-hole formed via micromolding in capillaries as shown in FIG. 2. The electron micrographs of the PEBA/PEI@silica through-hole carbon capture mixed matrix membrane is shown in FIGS. 9(a) and (b).

In particular, the PEBA polymeric support layer may be patterned with wire bar coating technique using a PDMS mold replicated by thermal nanoimprinting and replica molding techniques, as shown in FIG. 1. The electron micrographs of PEBA/PEI@silica patterned carbon capture mixed matrix membrane is shown in FIGS. 9(c) and (d).

Figure 10:
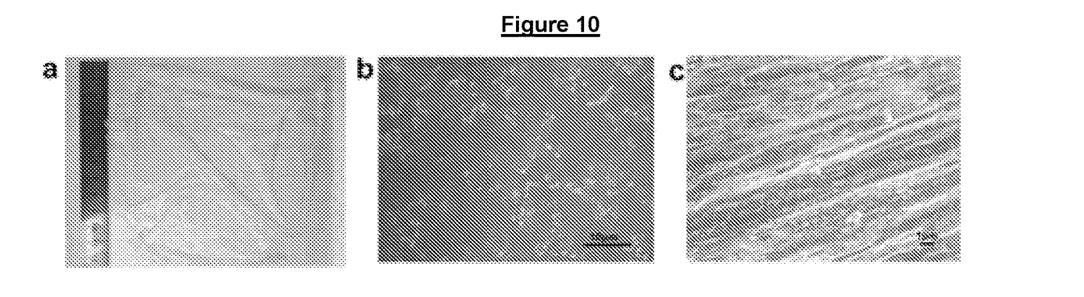

According to another embodiment, the carbon dioxide capture layer comprising PEI@silica may be embedded within the PEBA polymeric support layer. Even more in particular, the PEI@silica and PEBA may be vigorously stirred in a common solvent such as methanol, ethanol, water or a combination thereof to ensure good PEI@silica dispersion prior to being molded and/or patterned. FIG. 10(a) shows a photograph of the PEBA/PEI@silica carbon capture mixed matrix membrane, while FIGS. 10(b) and (c) show a top view and cross-sectional electron micrograph of the PEBAX/PEI@silica carbon capture mixed matrix membrane.

(ii) PEBA/PANI@GO Carbon Capture Mixed Matrix Membrane

Figure 11:
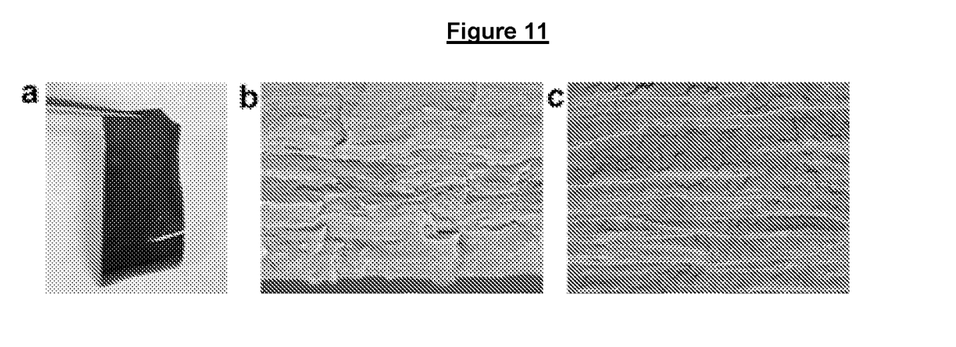

PEBA/PANI@GO carbon capture mixed matrix membrane may comprise PEBA as the polymeric support layer and PANI@GO as the carbon dioxide capture layer. The membrane may be prepared with different ratios of PANI@GO by casting with film applicator at low temperatures of <10° C. A patterned membrane may be achieved through capillary forces during the casting process. In particular, the PANI@GO endows the membrane with photothermal conversion ability that may drive the photothermal releasing of $CO_2$ from membrane. FIG. 11(a) shows a photograph of a PEBAX/PANI@GO membrane according to one embodiment of the present invention and FIGS. 11(b) and (c) provide the cross-sectional electron micrographs of the membrane.

According to a second aspect, the present invention provides a membrane module comprising at least one carbon capture mixed matrix membrane described above.

The membrane module may comprise two or more carbon capture mixed matrix membranes. In particular, each of the two or more carbon capture mixed matrix membranes may comprise a supporting layer of uniform sized pores, the pores of each supporting layer having a different pore size, thereby forming a hierarchical membrane module.

According to a particular aspect, the membrane module may be part of a modular separation system that minimises or eliminates the process interruption that is typically required for membrane cycling or replacement. The modular separation system may comprise one or more membrane modules as described above such that any one or more of the membrane modules may be easily swapped with another fresh membrane module when one of the modules is completely fouled or needs regeneration.

Figure 12:
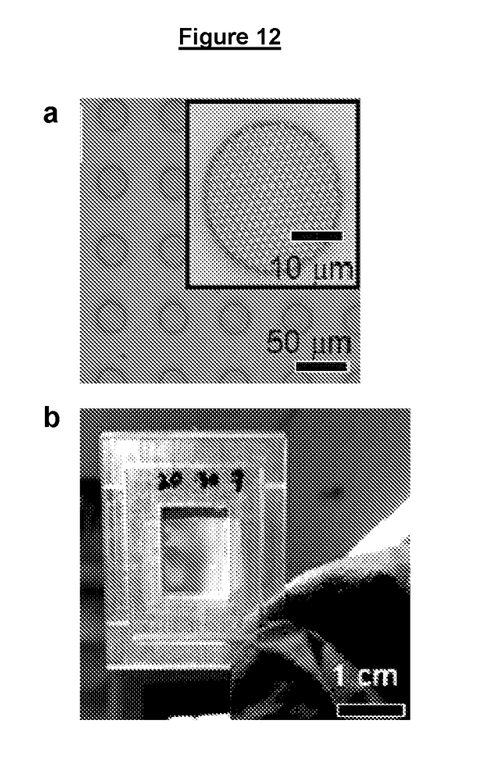
FIG. 12(a) shows an electron micrograph of an order porous carbon capture mixed matrix membrane according to one embodiment and FIG. 12(b) shows a membrane module according to one embodiment.

The membrane module may be formed by any suitable method. For example, the membrane module may be formed by 3-D printing. According to a particular aspect, the membrane module may be formed into a cassette unit that houses a series of carbon capture mixed matrix membranes. FIG. 12(a) show an electron micrograph of an ordered porous carbon capture mixed matrix membrane and FIG. 12(b) shows an example of a membrane module according to one embodiment of the present invention.

The membrane module comprising the hierarchical pores may be integrated with vehicle tailpipes to reduce carbon footprint. From time to time, the membrane module may be removed and subsequently collected for regeneration and $CO_2$ recovery. The membrane module may also be used in underground parking spaces or used as spiral-wound module.

According to a third aspect, the present invention provides a method of forming the carbon capture mixed matrix membrane as described above, the method comprising:
providing a polymeric support layer; and
forming a carbon dioxide capture layer in contact with the polymeric support layer, wherein the carbon dioxide capture layer comprises solid porous material with at least one carbon dioxide adsorption site.

The forming may be by any suitable means. For example, the forming may comprise depositing the carbon capture layer on the polymeric support layer or embedding the carbon capture layer in the polymeric support layer. These have been described in more detail above.

According to a particular aspect, the depositing may comprise dip-coating, spin coating, casting, or a combination thereof. According to another particular aspect, the embedding may comprise solution processing, or the like.

Whilst the foregoing description has described exemplary embodiments, it will be understood by those skilled in the technology concerned that many variations may be made without departing from the present invention.

Having now generally described the invention, the same will be more readily understood through reference to the following example which is provided by way of illustration, and is not intended to be limiting.

EXAMPLE

Example 1

Preparation of PEI@silica 5 g of polyethylenimine (PEI) having a molecular weight of 800 Da was dissolved in 50 mL of methanol. This solution was then added stepwise under stirring to 5 g of fumed silica suspension in 50 mL methanol. The mixture was stirred for more than 2 hours to ensure a good dispersion of the polyethylenimine on the silica support.

Example 2

Preparation of PEI@silica Modified Commercial Filtration Membranes

PEI(800)@silica was modified on a commercial filtration membrane (PVDF) and a polyethersulfone (PES) ultrafiltration flat sheet membrane through a filtration method (Wan S et al, 2016, Adv. Mater., 28:7862-7898). A layer of PEI@silica was successfully modified on the PVDF and PES membranes and simultaneously, pores of the filtration membranes were covered. However, since the porous networks of the PVDF and PES membranes are random and tortuous, an undesirable high pressure drop across the membrane was experienced.

Example 3

Preparation of PEI@GO Complexes

Figure 4:
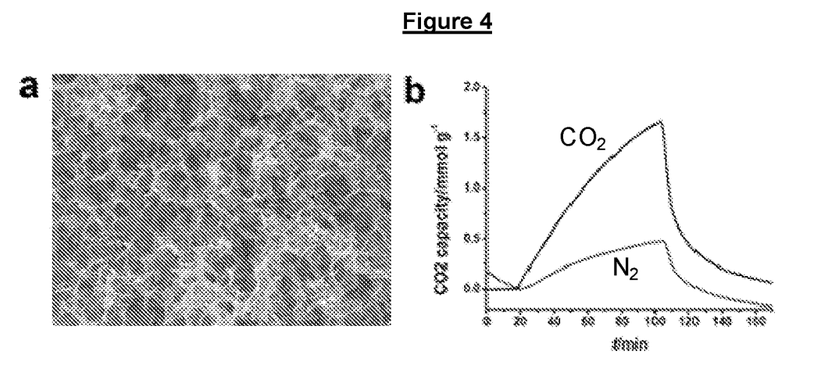
FIG. 4(a) shows an electron micrograph of a GO aerogel.
FIG. 4(b) shows the carbon capture capacity of the aerogel.
FIG. 4(c) shows the temperature of PEI@GO as a function of time as the NIR laser is turned on and off.

The PEI@GO as shown in FIG. 4 is prepared by the following method. GO was prepared by a modified Hummers method (J. Mater. Chem. A, 2015, 3:1142-1151) Aqueous GO dispersion was sonicated in ice-water bath for 6 hours prior to use. The pH value of GO (10 mg/mL) was adjusted to 8.0 gradually with 1 M NaOH aqueous solution. Then GO dispersion (10 mg/mL) was mixed with PEI (6.25 mg/mL) aqueous solution under intense stirring to produce a PEI-GO complex with the concentration of PEI and GO being 5 mg/ml and 2 mg/mL, respectively. The resultant complex solution was thermally annealed in a 90° C. oil bath for 3 hours with vigorous stirring to produce PEI-GO complex solution.

Example 4

Preparation of PANI Modified GO Suspensions

Figure 5:
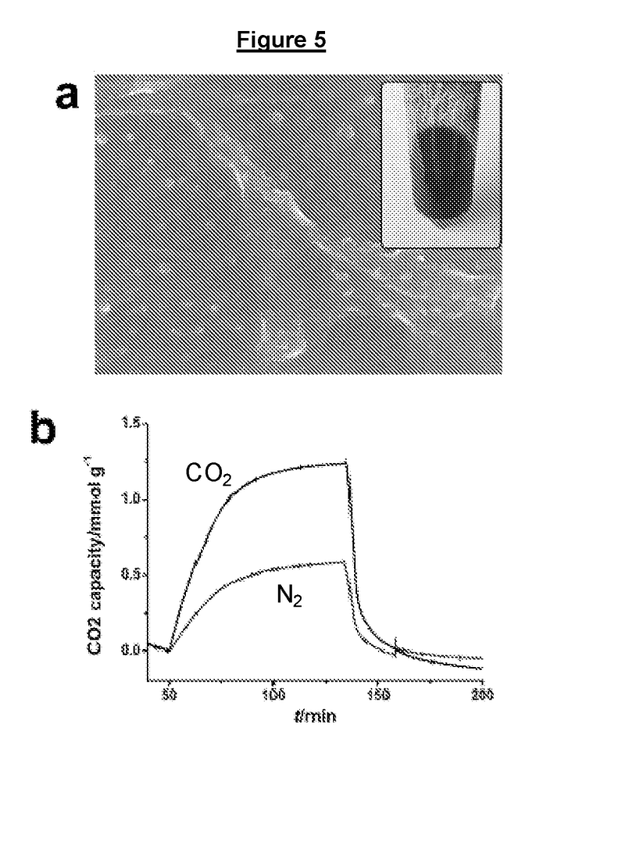
FIG. 5(a) shows an electron micrograph and FIG. 5(b) shows the carbon capture capacity of PANI@GO composites.
Figure 6:
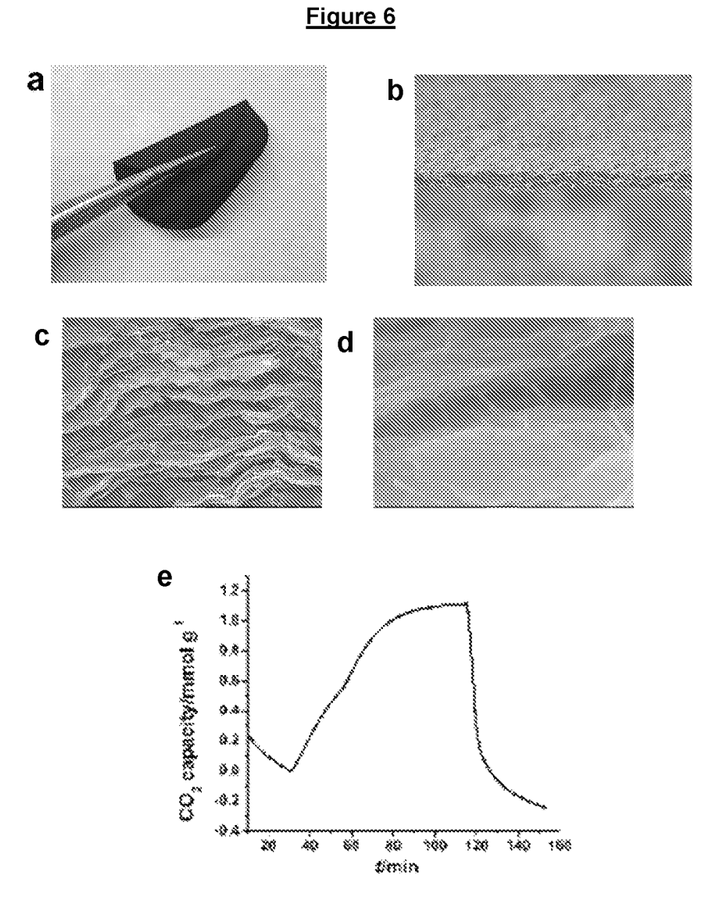

The PANI@GO as shown in FIGS. 5 and 6 is prepared by the following method. PANI@GO composites were synthesized by using in situ polymerization technique based on electrostatic interaction between aniline monomer (as an excellent electron donor) and GO (as a good electron acceptor). Aniline monomer was preferred to be absorbed on GO surface through electrostatic attraction. The adsorbed aniline monomer finely polymerized in the presence of ammonium peroxydisulfate (APS), which induced the polymerization of aniline monomer and formed PANI films on GO surfaces. GO was dispersed in 50 mL 1 M HCl solution to obtain GO/HCl dispersion with the concentration of GO being 2 g/L after sonication for 30 minutes. 0.2 g (0.2 mol) aniline was added in GO/HCl dispersion under stirring for 3 hours with $N_2$ protection. Another solution of APS (0.4 g/0.2 mol) in 10 mL HCl was prepared and added using a syringe pump. The feeding rate was set at 5 mL/h, so that the complete feeding took 2 hours. Reaction was carried out for 6 hours at 0° C. using an ice bath. The products were washed with HCl solution (1 M) and water twice, respectively, through centrifugation and finally dispersed in water.

The invention claimed is:

1. A carbon capture mixed matrix membrane comprising:
a polymeric support layer having a thickness of 50-500 μm and comprising spatially ordered uniform sized pores; and
a carbon dioxide capture layer in contact with the polymeric support layer, the carbon dioxide capture layer comprising solid porous material with at least one carbon dioxide adsorption site.

2. The membrane according to claim 1, wherein the carbon dioxide capture layer is in contact with the polymeric support layer by being disposed on the polymeric support layer or embedded within the polymeric support layer.

3. The membrane according to claim 1, wherein the polymeric support layer comprises a patterned surface.

4. The membrane according to claim 1, wherein the polymeric support layer comprises spatially ordered through-holes.

5. The membrane according to claim 1, wherein the pores comprised in the polymeric support layer have a diameter of 100 nm-100 μm.

6. The membrane according to claim 1, wherein the polymeric support layer comprises polyvinylidene difluoride (PVDF), polyethersulfone (PES), polysulfone (PSF), polyether block amide (PEBA) or copolymers thereof.

7. The membrane according to claim 1, wherein the solid porous material comprised in the carbon dioxide capture layer comprises amine-functionalised material.

8. The membrane according to claim 1, wherein the carbon dioxide capture layer comprises polyethyleneimine (PEI)@silica, PEI@graphene oxide, polyaniline(PANI) @graphene oxide, PEI@nanoporous carbons (NPCs), PEI@metal-organic framewoks (MOF), PEI@oxidised nanofibrillated cellulose (NFC), PEI@porous organic polymer, PEI@mesoporous molecular sieve, tetraethylenepentamine(TEPA)@grahene oxide, TEPA@silica, zeolite imidazolate framework 8 (ZIF-8), amine modified or unmodified Copper benzene-1,3,5-tricarboxylate (Cu-BTC), or a combination thereof.

9. The membrane according to claim 1, wherein the solid porous material comprises pores having an average diameter of 1-100 nm.

10. The membrane according to claim 1, wherein the membrane has a thickness of 50-2500 µm.

11. The membrane according to claim 1, wherein the solid porous material comprises a porous particle template with particles having an average particle size of 5-100 nm.

12. A membrane module comprising at least one carbon capture mixed matrix membrane according to claim 1.

13. The membrane module according to claim 12, wherein the membrane module comprises two or more carbon capture mixed matrix membranes.

14. The membrane module according to claim 13, wherein each of the two or more carbon capture mixed matrix membranes comprises a polymeric support layer of uniform sized pores, the pores of each polymeric support layer having a different pore size, thereby forming a hierarchical membrane module.

15. A method of forming a carbon capture mixed matrix membrane according to claim 1, the method comprising:
providing a polymeric support layer having a thickness of 50-500 µm and comprising spatially ordered uniform sized pores; and
forming a carbon dioxide capture layer in contact with the polymeric support layer, wherein the carbon dioxide capture layer comprises solid porous material with at least one carbon dioxide adsorption site.

16. The method according to claim 15, wherein the forming comprises depositing the carbon capture layer on the polymeric support layer or embedding the carbon capture layer in the polymeric support layer.

17. The method according to claim 16, wherein the depositing comprises dip-coating, spin coating, casting, or a combination thereof.

18. The method according to claim 16, wherein the embedding comprises solution processing.

19. The membrane according to claim 3, wherein the patterned surface comprises micropatterns.

* * * * *